United States Patent Office 3,471,589
Patented Oct. 7, 1969

1

3,471,589
POLYVINYL ACETAL RESINS
Maynard J. Rinehart, Florissant, Mo., assignor to The P. D. George Company, St. Louis, Mo., a corporation of Delaware
No Drawing. Filed May 12, 1965, Ser. No. 455,318
Int. Cl. C08f 27/20, 45/72
U.S. Cl. 260—839         18 Claims

ABSTRACT OF THE DISCLOSURE

Curable wire coating polyvinyl acetal composition including an organic titanium ester polyinvyl acetal curing agent for rapidly curing the polyvinyl acetal thereby enabling increased wire speeds of at least 45 feet/minute without increase of extractibles and without deleteriously affecting coat smoothness and conductors coated with such cured compositions.

---

This invention relates to polyvinyl acetal compositions and to modified polyvinyl acetal compositions which are especially adapted to serve as electrical insulation for conductors such as metals; processes of employing such compositions; and to conductors coated with these compositions.

Polyvinyl acetal and modified polyvinyl acetal compositions useful in electrical insulation are known to the trade as "Formvar" and "Formex" resins. These are useful as wire enamels.

Although these compositions have been satisfactory as insulative coatings possessing the required thermal properties, in certain instances they have failed to possess all of the many varied properties required for insulation in hermetically sealed motors, for example in applications in which monochlorodifluoromethane (refrigerant 22) is commonly used as a refrigerant. To meet commercial acceptance in this application, it is required that the solvent resistance of the coating, when measured by the extractibles from the coating, be as low as possible. In practice, the insulation industry measures such extractibles by solvent resistance of the cured coating to toluene. Stated another way, toluene extractibles are currently the standard by which the industry measures the suitability of hermetical wire enamels; the lower the toluene extractibles, the more acceptable the wire enamel. In other properties there are specified minimum values below which the particular coating will not be commercially acceptable.

Recently there have been developed certain modified polyvinyl acetal compositions which have obtained commercial acceptance in that their cured coatings have these desired properties including solvent resistance as measured by extractibles from the cured coating. Examples of such modified polyvinyl acetals are described in the following patents:

(1) U.S. Patent 3,077,462, as exemplified by claim 1, which states:

"A coating composition comprising an organic solvent solution of 100 parts by weight of a polyvinyl acetal and 18–400 parts by weight of a polyurethane represented by the general formula

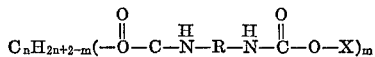

where R represents a member of the class consisting of phenylene, methyl phenylene, naphthylene and methyl naphthylene groups, X represents a member of the class consisting of phenyl and alkyl phenyl groups, said alkyl groups containing 1–6 carbon atoms, $m$ is an integer greater than 1 but not greater than $n$, and $n$ is an integer from 2–10, said solvent comprising a substantial amount of (1) a compound selected from the group consisting of

2 phenol, cresols and xylenols and (2) a compound taken from the class consisting of aliphatic and aromatic hydrocarbons."

(2) U.S. Patent 3,067,063, as exemplified by claim 1, which states:

"An insulated electrical conductor having an enamel-type insulation covering which comprises a mixture of a reactive isocyanate and a polyvinyl formal resin cured on the conductor to provide a hard, flexible, tough and abrasion-resistant insulation having good resistance to monochlorodifluoromethane, the isocyanate and polyvinyl formal being present in a ratio of 20 to 80 parts of isocyanate and 20 to 80 parts of polyvinyl formal."

(3) U.S. Patent 3,068,189, as exemplified by claim 1, which states:

"A coating composition comprising an organic liquid solution of 100 parts of a polyvinyl acetal, 1–30 parts of a phenol aldehyde resin, 0.5–20 parts of a melamine-aldehyde condensate resin and 20–200 parts of a polyurethane, said polyurethane consisting of the blocked adduct of an organic polyisocyanate with a reactive hydrogen containing compound which reverts to the polyisocyanate at about 150° C. and above."

(4) U.S. Patent 3,069,379, as exemplified by claim 1, which states:

"A composition comprising, in parts by weight, 100 parts polyvinyl acetal, 1–50 parts heat-hardenable phenol-aldehyde resin and 2–80 parts blocked polyisocyanate."

(5) U.S. Patent 3,037,959, as exemplified by claim 1, which states:

"A coating composition comprising an organic liquid solution of 100 parts of a polyvinyl acetal, 0.5–20 parts of a melamine-aldehyde condensate resin and 20–200 parts of a polyurethane, which polyurethane consisting of the blocked adduct of an organic polyisocyanate with a reactive hydrogen containing compound taken from the group consisting of phenols, secondary aromatic amines, alcohols, amides, lactams, mercaptans, enols and mixtures thereof."

These patents are incorporated by reference in the present patent application as if a part hereof. The present invention can be employed in conjunction with the compositions described in the above patents by employing titanates in conjunction therewith.

Although these formulations, also known as "Formetic" enamels, yield satisfactory hermetical insulation, the wire speeds employed in the preparation of such insulated wires are relatively slow if one desires to yield a product having low extractibles. For economic reasons, it is highly desirable to obtain higher wire speeds since an increase therein means that more insulated wire can be prepared in the same unit time, with obvious advantages, provided the properties of the insulated wire are not deleteriously affected by such speeds. Wire speeds should be as fast as possible but not so fast as to yield an inferior product. Stated another way, the quality of the insulated wire is a function of wire speed.

Another property of the insulated wire which is deleteriously affected by high wire speed is the smoothness of the coat. It is well known to the art that as wire speeds increase beyond an established point, smoothness deteriorates. Therefore, in order to reduce extractibles and to maintain smoothness, commercial wire speeds are currently maintained at about 25 feet/minute. Other properties are also deleteriously affected if the wire speed is too high.

I have now unexpectedly found that wire speeds employed in curing polyvinyl acetals can be increased without increasing extractibles and deleteriously affecting coat smoothness by incorporating certain titanium esters in the polyvinyl acetal formulations.

TITANIUM ESTERS

An example of such esters may be illustrated by the following ester of ortho titanium acid:

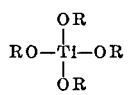

where the R's (which may be the same or different) are alcohol moieties such as hydrocarbon groups, for example alkyl (methyl, ethyl, propyl, butyl, pentyl, isomers thereof such as isopropyl, isobutyl, etc.); aryl (phenyl, cresyl, etc.); cycloalkyl (cyclohexyl, etc.), and the like.

Since the lower tetraalkyl orthotitanate, such as methyl and ethyl ortho titanates tend to hydrolyze quite readily, commercial lower alkyl orthotitanates generally sold are normal and secondary butyl orthotitanates, tetraisopropyl orthotitanate, tetraethylhexyl orthotitanate, etc.

Another example of a titanium ester is an acylated titanium acid as illustrated by the following formula

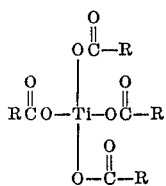

where R is the moiety of the carboxylic acid, preferably a hydrocarbon (such as alkyl, etc.), having the same meaning for R as specified above.

In essence the present invention relates to employing a titanium compound, whether as an alcohol or a carboxylate ester or any other titanium derivative which at the temperature of cure, can rapidly react with the enamel in a way so as to reduce extractibles.

The group blocking the OH of the titanium acid, Ti(OH)$_4$, should be able to be rapidly removed at the curing temperatures. Therefore, in general, the more volatile alcohol or carboxylate moieties which combine to form the titanium ester are employed. For example, it is more preferable to employ butyl titanate than to employ stearyl titanate or diethylene glycol titanate. In certain instances, less than fully esterified titanium acids or mixed alcohol-carboxylate esters can be employed, for example

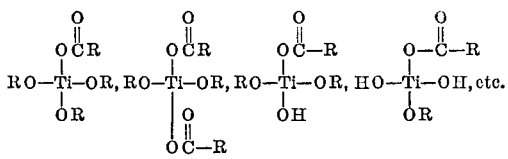

In essence, any derivative of the titanium acid, Ti(OH)$_4$, can be employed provided it is capable of increasing wire speed without deleteriously affecting the other properties of the cured resin. In general, those titanium acids which contain at least one blocked OH, but preferably a plurality of blocked OH groups and most preferably those esters in which all groups are blocked are employed. Any method of blocking can be employed provided the blocking group can be rapidly removed at curing temperature. Therefore, the more volatile blocking groups are employed. However, for optimum performance, one selects the group of proper volatility.

It is believed that as compared to free OH groups, the removal of the blocking group during curing, produces an extremely active OH group which produces the desired results of this invention. Although theoretically a wide variety of Ti(OH)$_4$ compounds can be employed in this invention, in practice alkyl alcohol esters, preferably the lower alky alcohol esters are employed. Most preferably the lower alky tetra-substituted esters are employed. The preferred species is tetrabutyl orthotitanate.

The results of this invention are unexpected for titanium esters are effective despite the fact that the formulation may already contain other very effective cross-linking agents such as phenolic resins, aminoplast resins such as melamine resins, and the well known very effective polyisocyanate cross-linking agents. In view of the widely known rapid curing effects of these agents, it was entirely unexpected that the presence of a titanium ester would yield the improvement of this invention.

The following examples of wire insulating compositions are presented by way of illustration and not of limitation. In each case, the components dissolved in the solvents were applied to the wire by following conventional wire enameling practice wherein the viscous resin solution was die-coated on the wire and cured by passing the wire through a baking oven having the temperature shown.

Example 1

A wire enamel formulation was prepared having the following composition.

| Resins: | | Percent activity |
|---|---|---|
| Polyvinyl formal resin, 1680.4 lb | | 100 |
| Blocked isocyanate ("Mondur S"), 2926.7 lb | | 34 |
| Melamine-formaldehyde resin, 185.6 lb | | 66 |
| Phenol-formaldehdye resin, 358.3 lb | | 43 |

| Solvents: | Lb. |
|---|---|
| Phenol solvent | 5483.1 |
| Aromatic solvent | 6709.9 |

The above components were placed in a mixing tank and stirred. Mild heating (less than 60° C.) was employed to facilitate solution. The resulting enamel was a clear viscous solution. It was filtered through a pressure filter.

This product, which is a standard "Formetic" wire enamel, weighed 8.46 lb./gal. had a solid content of 16.17% and a viscosity at 77° F. of 4000–5000 cps.

A wire enamel prepared from the formulation of Example 1 under the conditions stated had the properties shown in Table I.

Example 2

A formulation similar to Example 1 was prepared except that 13 lbs. of a cresylic acid solution containing 2% tetra-n-butyl orthotitanate was also added (2.6 lb. titanate ester).

A wire enamel prepared from the formulation of Example 2 under the conditions stated had the properties shown in Table I.

The relative proportions of the resin constituents in the above formulation based on active ingredients are as follows:

| | |
|---|---|
| Polyvinyl formal | 1.000 |
| Blocked isocyanate | 0.645 |
| Melamine resin | 0.071 |
| Phenolic resin | 0.091 |

(1) The polyvinyl formal employed in these examples is a commercially available grade "Formvar" 15/95E sold by Shawinigan Resins Corporation having the following properties:

| | |
|---|---|
| Average molecular weight | 24,000–40,000 |
| Hydroxyl content as percent polyvinyl alcohol | 5–6.0 |
| Acetate content as percent polyvinyl acetate | 9.5–13.0 |
| Formal content as percent polyvinyl formal | 82 |

(2) The phenol-formaldehyde resin is a commercial grade 43% syrup formed by the condensation reactions of paraformaldehyde and cresylic acid.

(3) The melamine resin is Monsanto's "Resimene" 882 which is a butylated melamine-formaldehyde resin (66% solids).

(4) The block polyurethane employed is 34% active Mondur S (Mobay Chemical Company). It is a diisocyanate partially blocked with a polyol and the unreacted moiety or excess is then blocked with a phenol. Specifically, it is the reaction product formed by reacting 3 moles of a mixture of 2,4- and 2,6-tolylene diisocyanates with trimethylol propane followed by reaction with m-cresol.

TABLE I.—COMPARATIVE PROPERTIES OF WIRE ENAMELS

| Properties | Column I Without Titanates | Column II With Titanates | Column III With Titanates |
|---|---|---|---|
| Oven temp., °F | 680 | 680 | 680 |
| Wire speed, ft./min | 45 | 45 | 50 |
| O.D. enamel | .0430-.0432 | .0429-.0432 | .0430-.0432 |
| O.D. bare | .0400-.0402 | .0400-.0402 | .0400-.0402 |
| Build | .0030-.0030 | .0029-.0030 | .0030-.0030 |
| Smoothness | (¹) | Smooth | Smooth |
| Exact mandrel | OK | OK | OK |
| Snap | OK | OK | OK |
| Adherence | Good | Good | Good |
| Elongation, percent | 35 | 35 | 34 |
| Elongation: | | | |
| 1× | OK | OK | OK |
| 1-Toluol, commercial grade 3° | OK | OK | OK |
| Boil, 1-Alcohol, denatured ethyl (min.) | 30 | 30 | 30 |
| Scott-twist | 136 | 134 | 137 |
| Tesla blow test | (²) | (³) | (³) |
| G.E. abrasion, 700 grams | 59 | 101 | 99 |
| Cut thru, °F., potentiometer | 533 | 580 | 587 |
| Percent extractibles toluol | 0.52 | 0.09 | 0.26 |
| Dielectrics | 9,200 | 10,860 | 10,666 |

¹ Many fine beads, sandy.
² 4 breaks at 10 ft.
³ 2 breaks at 10 ft.

From Table I it is quite evident that the presence of titanium in the composition improves the properties of the wire enamels as compared to corresponding wire enamels containing no titanium.

First of all, it is to be noted that conventional hermetical wire enamels have to be prepared at wire speeds of less than 25 ft./min. in order to prepare satisfactory wire enamels.

At twice these speeds, the superiority of titanium formulations as compared to nontitanium formulations becomes quite evident. Particularly note the following:

(1) Smoothness—whereas the nontitanium formulation (col. I) was sandy, the titanium-containing formulations (col. II and III) were smooth.

(2) Tesla blow test—whereas the nontitanium formulation (col. I) had four breaks, the titanium-containing formulations (col. II and III) had half as many, i.e., two breaks.

(3) G.E abrasion—whereas the nontitanium formulation (col. I) had a value of 59, the titanium-containing formulations (col. II and III) had a value which was 40% improved, i.e., 101 and 99.

(4) Cut through, °F.—whereas the nontitanium formulation had a value of 533° F., the titanium formulation had a value of 580 and 587° F.

(5) Percent extractibles—whereas the nontitanium formulation had extractibles of 0.52%, the titanium formulation had extractibles of about ⅕ that amount, i.e., 0.09% at the same wire speed (col. II) and ½ that amount 0.26% at a higher wire speed col. II. Stated another way, the extractibles in the nontitanium formulations were 500% greater at the same wire speed, and 100% greater than a titanium formulation at a higher wire speed.

POLYVINYL ACETALS

The polyvinyl acetals useful in this invention are obtained by reacting polyvinyl alcohol or a partially hydrolyzed polyvinyl ester with an aldehyde, especially formaldehyde. Polyvinyl formals contain a certain number of formal groups and may contain a certain number of hydroxyl groups and may contain a certain number of ester groups, depending upon the extent of the hydrolysis and the acetylation reactions. The preferred polyvinyl formal resins contain on a weight basis, 1-35% ester groups calculated as polyvinyl ester, 3-15% hydroxyl groups calculated as polyvinyl alcohol and the balance substantially formaldehyde acetal. In the commercial polyvinyl formals, the ester groups are acetate groups. Other polyvinyl acetals such as the reaction product of hydrolyzed polyvinyl esters with acetaldehyde, propionaldehyde, butyraldehyde and benzaldehyde, may also be employed.

POLYISOCYANATES

The blocked polyisocyanates used herein are those which on heating above 150° C. yield a free polyisocyanate. These materials are also known as hidden and disguised polyisocyanates and are available in various commercial forms such as Mondur S and Mondur SH. Examples of such materials may be found in U.S. Patent 2,797,232, British Patent 755,942, French Patent 339,547, and elsewhere.

Although one is able to employ polyisocyanates as such, in practice one employs blocked polyisocyanates for best results.

They may be described as adducts of organic polyisocyanates, having the isocyanate group's reactive hydrogen blocked by another organic compound. The adduct portion of the polyurethane is removed by the elevated temperatures of the cure reaction, permitting the remaining polyisocyanate to cross-link the resinous composition.

Suitable polyisocyanates include compounds such as phenylene diisocyanates, diphenylene diisocyanates, tolylene diisocyanates, naphthylene diisocyanates, diphenylmethane diisocyanates, cyclohexane diisocyanates, ethylene diisocyanate, tetramethylene diisocyanate, hexamethylene diisocyanate, polyaryl polyisocyanates, trimers of polyisocyanates, polyisocyanates which are the reaction products of diisocyanates or triisocyanates with polyhydric alcohols, and the like, and mixtures, trimers and isomers thereof. The simplest class of useful polyisocyanates can be represented by the following formula:

where R represents a member of the class consisting of aliphatic hydrocarbons containing up to 8 carbon atoms, aromatic hydrocarbons containing up to 6 carbon atoms, and alkyl-aryl substitutes thereof, and $n$ is an integer from 2-4.

Typical trimers of the useful polyisocyanates can be illustrated by the following general formula:

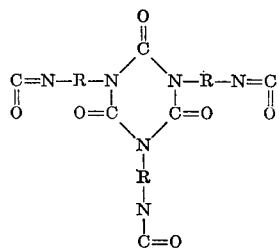

where R is the same as defined in the above formula for the polyisocyanates. Typical examples of the reaction products of polyisocyanates with polyhydric alcohols can be illustrated by the following general formula:

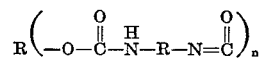

where R is the same as defined in the above formula for the polyisocyanates and $n$ is an integer from 2-10. Suitable reactive hydrogen-containing compounds combining with the polyisocyanates to form the desired polyurethanes include phenols such as phenol, cresol, xylenols, etc., secondary aromatic amines, alcohols (mono- and polyfunctional), amides, lactams, mercaptans, enols and the like. Mixtures thereof can also be used to block the polyisocyanates. The preferred blocking agents are compounds with the hydroxyl group attached to the aromatic ring.

Polyurethanes may be prepared by reacting the monohydric phenol with the reaction product of a polyhydric alcohol and an arylene diisocyanate. The polyhydric alcohols are in general preferably limited to compounds containing not more than 16 carbon atoms. For use in wire enamel, the polyhydric alcohols should contain preferably not more than 10 carbon atoms. Examples of these alcohols are, ethylene glycol, propylene glycol, glycerol, trimethylol propane, pentaerythritol, one of the isomeric hexanetriols, etc., the monohydric phenol may be an aryl compound such as phenol, cresols, xylenols and ethyl phenol. This class of polyurethanes can be represented by the general formula:

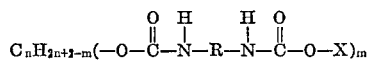

where R represents a member of the class consisting of phenylene, methyl phenylene, dimethyl phenylene, naphthylene and methyl naphthylene group, X represents a member of the class consisting of phenyl and alkyl phenyl groups, said alkyl groups containing 1–6 carbon atoms, $m$ in an integer greater than 1 but no greater than $n$, and $n$ is an integer from 2–10.

AMINOPLAST RESINS

Aminoplast resins can also be employed in this invention. These include, for example, urea-aldehyde resins, etherified urea-aldehyde resins, melamine-aldehyde resins, etherified melamine-aldehyde resins, triazine resins, etc. In the preferable embodiments, the aldehyde employed is formaldehyde. These resins should be soluble in solvents employed for enamels.

Melamine resins which may be used in the present invention can be selected from the general class of resinous aldehyde condensation products of melamine which are soluble in the organic liquids employed as solvents for the resinous components of the enamel. The useful melamine compounds include such derivatives of melamine as melam and melem. The aldehyde condensation products are well known and may be formed by reacting from 1–6 mols of the aldehyde with 1 mol of melamine. The solubility of the melamine-aldehyde condensation product is generally obtained by further reacting the condensation product with an alcohol or by co-condensing the melamine and aldehyde in the presence of an alcohol.

The aldehydes which may be used are aliphatic, aromatic, cyclic and heterocyclic aldehydes including formaldehyde, aceetaldehyde, propionaldehyde, butyraldehyde, isobutyraldehyde, valeraldehyde, octaldehyde, benzaldehyde, cinnamaldehyde, cyclohexanone, furfural, etc.

The alcohols which may be used include aliphatic, cycloaliphatic, aromatic, nitro, and amino alcohols such as methanol, ethanol, propanol, isopropanol, butanol, isobutanol, pentanols, octanols, lauryl alcohol, cetyl alcohol, stearyl alcohol, cyclohexanol, benzyl alcohol, cinnamyl alcohol, allyl alcohol, 2-nitro-1-butanol, 2-nitro-2-methyl-1-propanol, 2-nitro-2-methyl-1,3-propane diol, 2-nitro-2-ethyl-1,3-propane, diol, tris(hydroxymethyl)nitromethane, 2-amino-1-butanol, 2-amino-2-methyl-1-propanol, 2-amino-2-methyl-1,3-propane diol, 2-amino-2-ethyl-1,3-propane diol, tris(hydroxymethyl)aminomethane, etc. Mixtures of two or more alcohols may be used if desired. The amounts of alcohol reacted are generally equal to or in excess of the formaldehyde on a molar ratio.

PHENOLIC RESINS

It is well known that phenolic resins are formed by the reaction of a polyfunctional (di-, tri- tetra-, etc.), material with a material (also polyfunctional) which supplies a bridging or linking radical, for example ketones, aldehydes, etc. Thus, in the production of phenol-aldehyde resins, the phenol may be trifunctional as with phenol, difunctional as with a hydrocarbon-substituted phenol such as p-tert-butyl-phenol or tetrafunctional as with certain bis-phenols. The aldehyde serves to supply the bridging methylene radical.

The phenol-aldehyde resins which are useful in the present invention are those soluble in the solvent systems employed for the preparation of wire enamels. Such can readily be selected from the general class of heat-hardenable phenol-aldehyde resins. The phenolic portion of the resin may be phenol, cresol, xylenols, mixtures of xylenols, cresols, wood-oil phenolic bodies, petroalkyl phenols, coal tar phenols and others. The aldehyde portion of the resin may be formaldehyde, aceetaldehyde or other suitable aldehydes. The preferred composition of phenol-aldehyde resin useful in the wire enamels of this invention is obtained by reacting one mole of the phenol compound, for example cresylic acid, with 1–2.0 moles of formaldehyde. Suitable phenols include the following:

Para-, meta- and orthocresols; para-, meta- and orthoethyl-phenol; 3-methyl-4-ethyl-phenol; 3-methyl-4-propyl-phenol; 2-ethyl - 3 - methyl-phenol; 2-propyl - 3 - methyl-phenol; para- and ortho-propyl-phenol; para-tertiary-butyl-phenol; para-secondary-butyl-phenol; para-tertiary-amyl-phenol; para-secondary-amyl-phenol; para-tertiary-hexyl-phenol; paraisooctyl-phenol; orthophenol-phenol; paraphenyl-phenol; thymol; orthobenzyl-phenol; para-benzyl-phenol; paracyclohexyl-phenol; paratertiary-decyl-phenol; paradodecyl-phenol; paratetradecyl-phenol; para-octadecyl-phenol; paranonyl-phenol; paramenthyl-phenol; paraeicosanyl-phenol; paradocosanyl-phenol; paratetracosanyl-phenol; para-beta-naphthyl-phenol; para-alpha-naphthyl-phenol; parapentadecyl-phenol.

Tri- and tetrafunctional phenols can also be employed, for example those derived from bisphenol, as exemplified by the following:

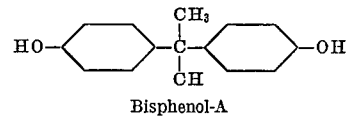

Bisphenol-A

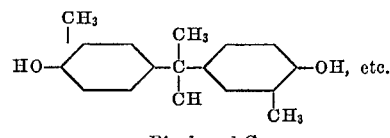

Bisphenol-C

The preparation of the phenolic resins may be either base or acid catalyzed. Examples of phenol-aldehyde which can be employed herein can be found in the following patents:

| | |
|---|---|
| 1,800,295 | 2,052,093 |
| 1,800,296 | 2,058,797 |
| 1,870,454 | 2,074,509 |
| 1,870,453 | 2,613,198 |
| 1,870,455 | 2,079,210 |
| 1,968,080 | 2,101,944 |
| 1,988,353 | 2,112,022 |
| 1,988,354 | 2,123,898 |
| 1,988,355 | 2,139,081 |
| 1,996,069 | 2,165,380 |
| 1,996,070 | 2,626,249 |
| 1,998,356 | 2,649,433 |
| 2,012,277 | 3,141,005 |
| 2,012,278 | |

Where the polyurethane (i.e. blocked isocyanate), phenol-aldehyde resin and aminoplast resins such as melamine aldehyde resin are used in the polyvinyl acetal composition, the composition may contain, for example, the following ratios based on 100 parts of polyvinyl acetal— (1) about 5–200 parts of polyurethane; (2) about 1–150 parts of phenol-aldehyde resin; (3) about 0.5–20 parts of melamine-aldehyde resin and (4) about 0.001–20 parts of titanium esters; such as (1) about 20–90 parts of polyurethane; (2) about 3–100 parts of phenol aldehyde resin; (3) about 0.75–15 parts of melamine and aldehyde resin; and (4) about 0.003–10 parts of titanium ester; but preferably (1) about 40–80 parts of polyurethane; (2) about 5–70 parts of phenol-aldehyde resin; (3) about 1–10 parts of melamine-aldehyde resin; and (4) about 0.005–5 parts of titanium ester. For the best balance of properties required for wire coating one employs (1)

about 50 to 70 parts of polyurethane; (2) about 5 to 20 parts of phenol-aldehyde resin; (3) about 3 to 15 parts of melamine resin; and (4) about .01 to 0.5 part of titanium esters.

Although it is preferred to employ all components for optimum properties, the presence of the polyurethane is particularly desirable. If one desires to omit certain of the above components the amounts specified about for that component would be zero. Instead of employing the individual ratios for phenol-aldehyde and melamine-aldehyde resins specified above, one may use either resin in the ratios stated or of the combined ratios of both resins.

In general, the use of the titanium esters of this invention improves polyvinyl acetal resins. It is particularly valuable for improving polyvinyl acetal resins containing polyurethanes. However, the best balance of properties is obtained by employing the titanium ester in polyvinyl acetal resin containing auxiliary resins such as phenol-aldehyde resins, melamine-aldehyde resins or both phenol-aldehyde and melamine-aldehyde resins. Optimum properties are obtained by employing the titanium esters in polyvinyl acetal resins which also contain polyurethane, phenol-aldehyde resin and melamine-aldehyde resin. The amount of titanium ester employed will vary with the specific titanium ester, the specific polyvinyl acetal resin and the presence, absence, and ratios of other components such as polyurethanes, phenol-aldehyde resins, melamine aldehyde resins, etc. In general, a sufficient amount of the titanate ester is employed to yield the desired properties.

Regardless of the individual components, for optimum properties in the wire enamel it is desirous to control the amount of titanium (as atomic titanium) in the wire enamel. For example, it is desirable that the wire enamel contain from about 50–500 p.p.m. of titanium (calculated as atomic Ti), such as 80–130 p.p.m., but preferably 100–120 p.p.m. In general, it is preferable to keep titanium concentrations within these ranges since too high or too low a concentration may have an adverse effect on wire properties.

To be used as a coating composition, the components thereof should be dissolved in a substantially anhydrous organic solvent medium. Any nonreactive volatile mutual solvents for the resinous components may be used, such as ethylene dichloride, trichloroethylene or mixed solvent systems of alcohols, esters and hydrocarbons. For the coating of magnet wire, the solvent medium preferably contains a substantial amount of a phenol such as phenol, cresols, xylenols, and an aliphatic or aromatic hydrocarbon such as xylene, naphtha and mixtures such as the high solvency petroleum hydrocarbons used in the examples. The naphtha hydrocarbon mixtures used for the preparation of the wire enamels are generally mixtures of aromatic liquid hydrocarbons of boiling range 150–184° C. derived from coal tar and/or petroleum. The cresylic acid used is a mixture of liquid phenolic compounds consisting primarily of xylenols and cresols and having a boiling range of 195–227° C.

The wire enamels of the present invention are stable indefinitely under usual storing conditions. In general, the curing reaction generally initiates at temperatures of about 150° C. with the reaction proceeding more rapidly as the temperatures increase. In the commercial type wire towers generally employed for wire enameling, it is preferred to conduct the reaction at tower operating temperatures of approximately 300 to 450° C.

The resins of this invention form valuable insulative coatings both on magnet wire and in other applications such as for example foil condensers. These coatings are smooth, glossy, tough, adhere well to metals, are resistant to solvents and abrasion, and are superior to conventional wire enamels in hermetical applications.

It is to be understood that the present invention is not limited to the particular wire coating compositions, applications or wire sizes described above. It is possible to utilize the present coating compositions as the base coat on a wire and to apply as an overcoat one or more of the many compatible insulating varnishes and thereby obtain a coating acceptable at even higher operating temperatures. The present enamels may be applied as the varnish over a base coat of less thermally resistant and solvent resistant coatings. Nor is it intended to limit the application of the resins to electrical wire insulation.

It is possible, therefore, by means of extrusion, dipping, casting and other known means to form insulation from such a mixture that is useful in such electrical applications as slot liners, encapsulation, sheet insulation, and surface coatings. The coating compositions shown can also be used as adhesives or impregnating varnishes for such articles as glass tapes and electrical coils. Other non-electrical uses of the compositions are apparent where chemical resistance and temperature stability of the final product are needed, such as surface coatings and others.

As is quite evident, new hermetical polyvinyl acetal resin compositions will be constantly developed which could be improved in accord with this invention. It is, therefore, impossible to attempt a comprehensive catalogue of all such compositions. This invention lies in the use of suitable titanates in conjunction with such resins and their individual components are important only in the sense that they yield the improved hermetical resin when cured with titanates in accord with this invention. To precisely define each specific useful hermetical resin and titanate in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific hermetical resins suitable for this invention which can be cured with titanates as described herein. In analogy to the case of a machine, wherein the use of certain materials of construction or dimensions of parts would lead to no practical useful result, various hermetical resins may be rejected as inapplicable where others would be operative. One can obviously assume that no one will wish to use an inferior or useless resin-titanate system nor will be misled because it is possible to misapply the teachings of the present disclosure to do so. Thus, any hermetical polyvinyl acetal resin composition or titanate that can yield the improved hermetical resin can be employed. The essence of the present invention is that it improves on hermetical resins of low toluene extractibles for example about 1–3% or less, but preferably about 1% or less, by further reducing extractibles even at high wire speeds.

Having thus described my invention what I claim as new and desire to obtain by Letters Patent is:

1. A curable wire coating polyvinyl acetal composition of matter consisting of a polyvinyl acetal resin, characterized by the presence therein of an organic titanium ester as the polyvinyl acetal curing agent.

2. A conductor insulated with the cured composition of claim 1.

3. A curable wire coating polyvinyl acetal composition of matter consisting of a polyvinyl acetal resin and a polyisocyanate, further characterized by the presence therein of an organic titanium ester as the polyvinyl acetal curing agent.

4. A conductor insulated with the cured composition of claim 3.

5. A curable wire coating polyvinyl acetal composition of matter consisting of a polyvinyl acetal, a polyisocyanate, and a member selected from the group consisting of (1) a phenol-aldehyde resin, (2) an amino-aldehyde resin, and (3) a mixture of (1) and (2), further characterized by the presence therein of an organic titanium ester as the polyvinyl acetal curing agent.

6. A conductor insulated with the cured composition of claim 5.

7. A curable wire coating polyvinyl formal composition of matter consisting of a polyvinyl formal resin, further characterized by the presence therein of a tetra-(lower alkyl)titanium ester as the polyvinyl formal curing agent.

8. A conductor insulated with the cured composition of claim 7.

9. A curable wire coating polyvinyl formal composition of matter consisting of a polyvinyl formal resin and a blocked polyisocyanate, further characterized by the presence therein of a tetra(lower alkyl)titanium ester as the polyvinyl formal curing agent.

10. A conductor insulated with the cured composition of claim 9.

11. A curable wire coating polyvinyl formal composition of matter consisting of polyvinyl formal resin, a blocked polyisocyanate and a member selected from the group consisting of (1) a phenolformaldehyde resin, (2) a melamine-formaldehyde resin, and (3) a mixture of (1) and (2), further characterized by the presence therein of a tetra(lower alkyl)titanium ester as the polyvinyl formal curing agent.

12. A conductor insulated with the cured composition of claim 11.

13. The composition of claim 7 wherein the tetra(lower alkyl)titanium ester is tetrabutyl orthotitanate.

14. The insulated conductor of claim 8 wherein the tetra(lower aklyl)titanium ester is tetrabutyl orthotitanate.

15. The composition of claim 9 wherein the tetra(lower alkyl)titanium ester is tetrabutyl orthotitanate.

16. The insulated conductor of claim 10 wherein the tetra(lower alkyl)titanium ester is tetrabutyl orthotitanate.

17. The composition of claim 11 wherein the tetra (lower alkyl)titanium ester is tetrabutyl orthotitanate.

18. The insulated conductor of claim 12 wherein the tetra(lower alkyl)titanium ester is tetrabutyl orthotitanate.

References Cited

UNITED STATES PATENTS

| | | | |
|---|---|---|---|
| 2,917,414 | 12/1959 | McLean | 117—221 |
| 3,012,007 | 12/1961 | Caflisch et al. | 117—232 |
| 3,072,596 | 1/1963 | Lavin et al. | 117—232 |
| 3,239,598 | 3/1966 | Olson et al. | 117—232 |

MURRAY TILLMAN, Primary Examiner

JOHN C. BLEUTGE, Assistant Examiner

U.S. Cl. X.R.

117—221, 232, 161; 260—73, 71, 840, 844, 851